(12) United States Patent
Lu et al.

(10) Patent No.: US 11,894,735 B2
(45) Date of Patent: Feb. 6, 2024

(54) MANUFACTURING METHOD OF FAN STATOR STRUCTURE

(71) Applicant: ASIA VITAL COMPONENTS (CHINA) CO., LTD., Shenzhen (CN)

(72) Inventors: Yeh-Chih Lu, Shenzhen (CN); Hsin-Hung Chen, Shenzhen (CN)

(73) Assignee: ASIA VITAL COMPONENTS (CHINA) CO., LTD., Shenzhen (CN)

( * ) Notice: Subject to any disclaimer, the term of this patent is extended or adjusted under 35 U.S.C. 154(b) by 105 days.

(21) Appl. No.: 17/065,520

(22) Filed: Oct. 8, 2020

(65) Prior Publication Data

US 2022/0115934 A1  Apr. 14, 2022

(51) Int. Cl.
*H02K 15/08* (2006.01)
*H02K 15/02* (2006.01)
*H02K 15/00* (2006.01)
*H02K 7/14* (2006.01)

(52) U.S. Cl.
CPC .......... *H02K 15/08* (2013.01); *H02K 7/14* (2013.01); *H02K 15/0081* (2013.01); *H02K 15/02* (2013.01)

(58) Field of Classification Search
CPC .......... H02K 15/0068; H02K 15/0081; H02K 15/02; H02K 15/08; H02K 2203/03; H02K 3/522; H02K 7/14
See application file for complete search history.

(56) References Cited

U.S. PATENT DOCUMENTS

| 5,343,104 | A  | * | 8/1994 | Takahashi | H02K 5/225 310/90 |
| 10,396,616 | B2 | * | 8/2019 | Beetz | H02K 3/522 |
| 11,336,143 | B2 | * | 5/2022 | Yasumura | F04D 25/0646 |
| 2006/0012261 | A1 |   | 1/2006 | Ku et al. | |
| 2013/0057095 | A1 | * | 3/2013 | Okinaga | H02K 5/225 310/71 |
| 2013/0200743 | A1 |   | 8/2013 | Okimitsu | |

(Continued)

FOREIGN PATENT DOCUMENTS

| CN | 1213210 A | 4/1999 |
| CN | 1722567 A | 1/2006 |

(Continued)

OTHER PUBLICATIONS

Search Report dated Jan. 19, 2021 issued by Taiwan Intellectual Property Office for counterpart application No. 109133384.

(Continued)

*Primary Examiner* — Minh N Trinh
(74) *Attorney, Agent, or Firm* — Bradley J. Thorson; DeWitt LLP

(57) ABSTRACT

A manufacturing method of fan stator structure includes the steps of providing a fan stator; providing a plurality of coil lead wire holders at an end of the fan stator; and winding lead wires on the fan stator to form coils, and setting and connecting a front end and a back end of each of the lead wires to the coil lead wire holders. The above method eliminates the drawbacks of the conventional fan stator coil winding operation, such as requiring manual twisting and trimming of the lead wire front ends and back ends and leaking of tin solder occurred during welding of the lead wires to a circuit board.

7 Claims, 10 Drawing Sheets

(56) References Cited

U.S. PATENT DOCUMENTS

| | | | | |
|---|---|---|---|---|
| 2014/0132093 A1* | 5/2014 | Purohit | ................... | H02K 9/227 310/50 |
| 2014/0361645 A1* | 12/2014 | Beyerl | ................... | H02K 11/33 310/50 |
| 2020/0161924 A1 | 5/2020 | Yasumura et al. | | |
| 2022/0115934 A1* | 4/2022 | Lu | ...................... | H02K 15/0068 |

FOREIGN PATENT DOCUMENTS

| | | | |
|---|---|---|---|
| CN | 2840485 Y | * | 11/2006 |
| CN | 101479914 A | | 7/2009 |
| CN | 107171465 A | | 9/2017 |
| CN | 108512335 B | | 6/2020 |
| JP | H6-351185 A | | 12/1994 |
| JP | H0759288 A | | 3/1995 |
| JP | H8-126238 A | | 5/1996 |
| JP | H1118345 A | | 1/1999 |
| TW | 200726038 A | | 7/2007 |
| TW | 200924348 A | | 6/2009 |

OTHER PUBLICATIONS

Search Report dated Feb. 24, 2022 issued by China National Intellectual Property Administration for counterpart application No. 2020110245087.

Search Report dated Oct. 28, 2022 issued by China National Intellectual Property Administration for counterpart application No. 2020110245087.

* cited by examiner

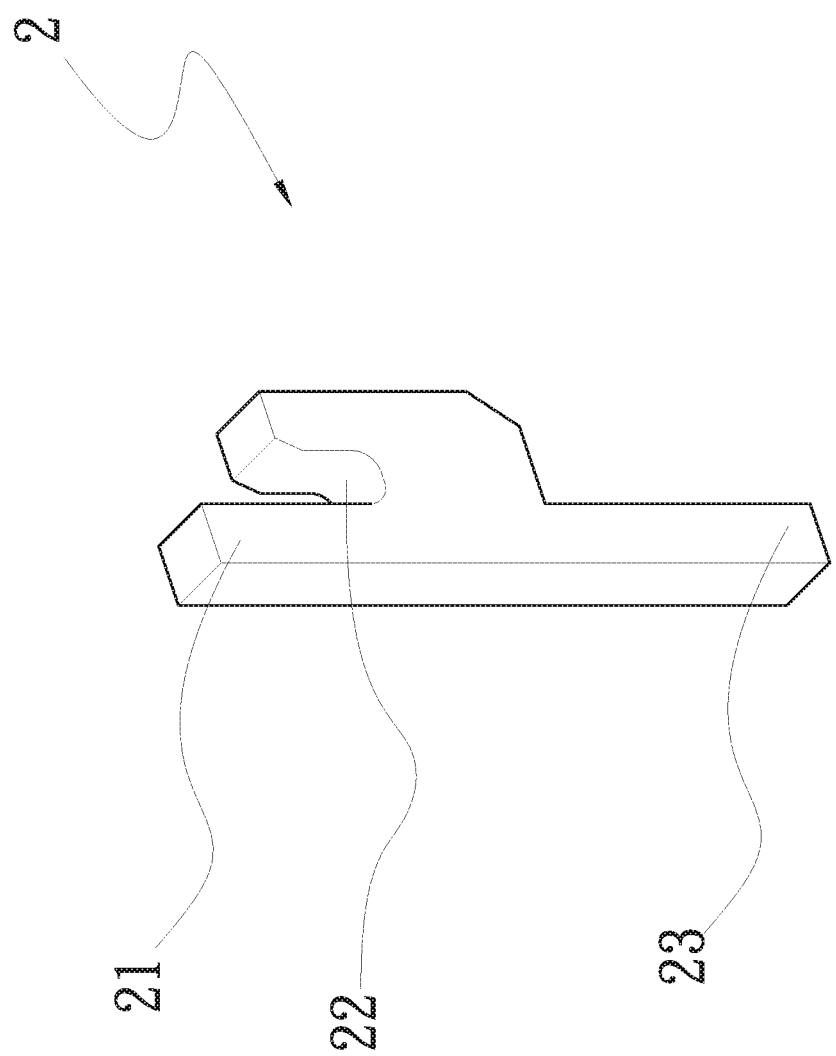

MANUFACTURING METHOD OF FAN STATOR STRUCTURE

FIELD OF THE INVENTION

The present invention relates to a manufacturing method of fan stator structure, and more particularly, to a manufacturing method of fan stator structure, which enables increased efficiency in winding stator coils, trimming lead wires of the stator coils, and electrically connecting the coils to a circuit board.

BACKGROUND OF THE INVENTION

A stator assembly and a rotor assembly are two main components of a fan, and the stator assembly causes the rotor assembly to rotate through electromagnetic induction. As shown in FIGS. 1a, 1b and 2a to 2c, a conventional stator assembly 5 is formed by laminating a plurality of silicon steel sheets 51; providing upper and lower insulating supports 52, 53 to upper and lower ends of the silicon steel lamination 51, respectively; winding lead wires around poles of the silicon steel lamination to form coils 54; and finally, welding the coils to a circuit board 55 to complete the stator manufacturing procedures.

According to a conventional technique, the coils 54 of the stator assembly 5 can be wound manually or using an automated machine. In the conventional winding operation, first bind a front end 541 of a lead wire for forming each of the coils 54 to one of the poles by turning the lead wire one circle around the pole, as shown in FIG. 1a, and the front end 541 is kept as a free end for twisting later (see FIG. 1b). The coil winding is performed on all poles. After the coil winding, a back ends 542 of the lead wires for forming the coils 54 and the front ends 541 thereof are organized one by one. According to the conventional winding technique, the lead wire ends organization must be manually handled into twisted strands, which consumes a lot of labors and time. And, the twisted strands formed of the front ends 541 and back ends 542 of the coils 54 by different operators are often different in strand thickness and length, and therefore, they must be manually trimmed to adjust to an appropriate length, as shown in FIGS. 2a and 2b.

Further, when inserting and electrically connecting the twisted and trimmed strands of the front and back ends 541, 542 of the coils 54 to the circuit board 55, the strands are fixed to the circuit board 55 by tin welding, as shown in FIG. 2c. Since the twisted strands of the front and back ends 541, 542 of the coils 54 is thicker than the original lead wires, vias 56 formed on the circuit board 55 must be correspondingly expanded. A problem of the expanded vias 56 is tin leaking and large weld nuggets 6. Sections of the front and back ends 541, 542 of the coils 54 that are remained after the welding are exposed from the weld nuggets 6 and look ugly. Further, the remained sections of the front and back ends of the coils 54 tend to cause a short circuit if they are too long and therefore, must be manually cut off, which again consumes a lot of time and labors.

While the conventional fan stator coil winding operation can be done with a mechanically automated machine, the steps of twisting and trimming the front ends and back ends of the wound lead wires still rely on manual handling, which inevitably prevents the conventional fan stator manufacturing from high production efficiency and increased good yield rate.

It is therefore an important target among the fan stator manufacturers to eliminate the drawbacks in the conventional fan stator winding operation, reduce the labor and time thereof, and further reduce the bad yield rate.

SUMMARY OF THE INVENTION

To solve the drawbacks of the conventional fan stator coil winding operation, a primary object of the present invention is to provide an improved manufacturing method of fan stator structure that saves labors and shortens manufacturing time required to wind the coils of a fan stator.

To achieve the above and other objects, the manufacturing method of fan stator structure according to the present invention includes the following steps:
   providing a fan stator;
   providing a plurality of coil lead wire holders at an end of the fan stator; and
   winding lead wires on the fan stator to form coils, and setting and connecting a front end and a back end of each of the lead wires to the coil lead wire holders.

With the manufacturing method of fan stator structure according to the present invention, it is possible to largely reduce the time and labors needed to manufacture the fan stator, reduce the manufacturing costs, and upgrade the production efficiency and good yield rate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIGS. 1a, 1b, 2a, 2b and 2c pictorially illustrate conventional steps for manufacturing a fan stator;

FIG. 4b shows a coil lead wire holder used in the method of the present invention;

DETAILED DESCRIPTION OF THE PREFERRED EMBODIMENTS

Figure 1B:
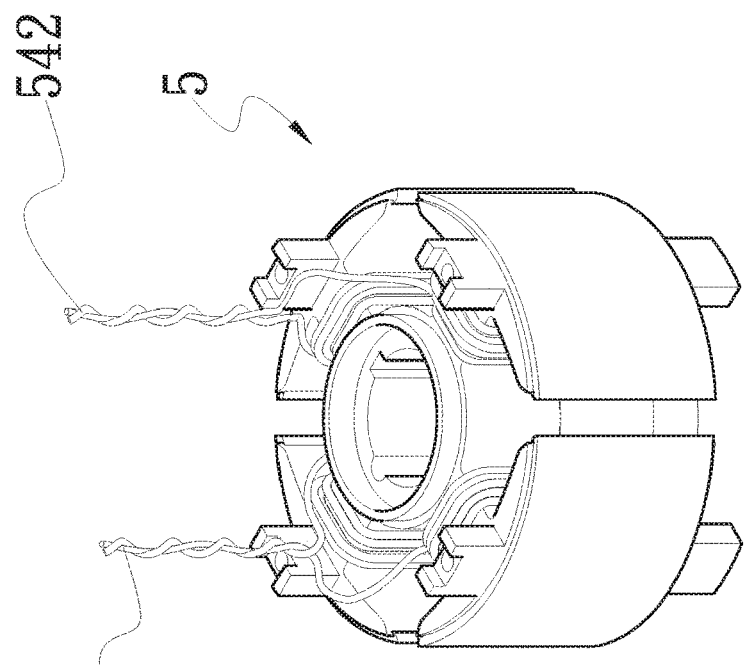
Figure 1A:
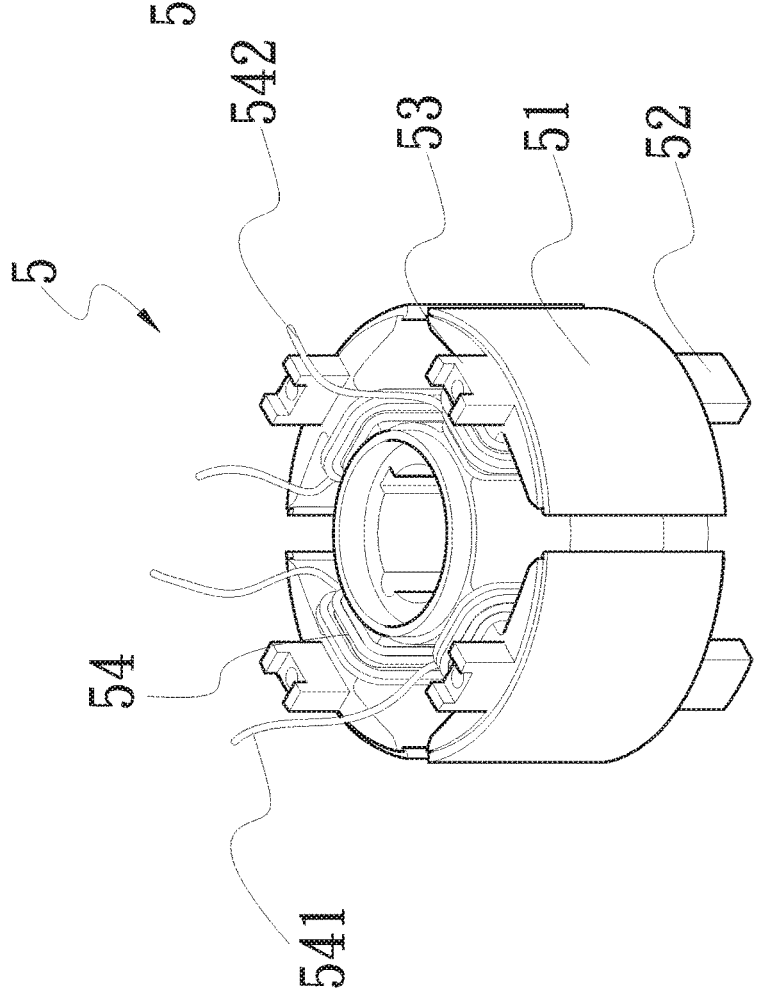
Figure 2B:
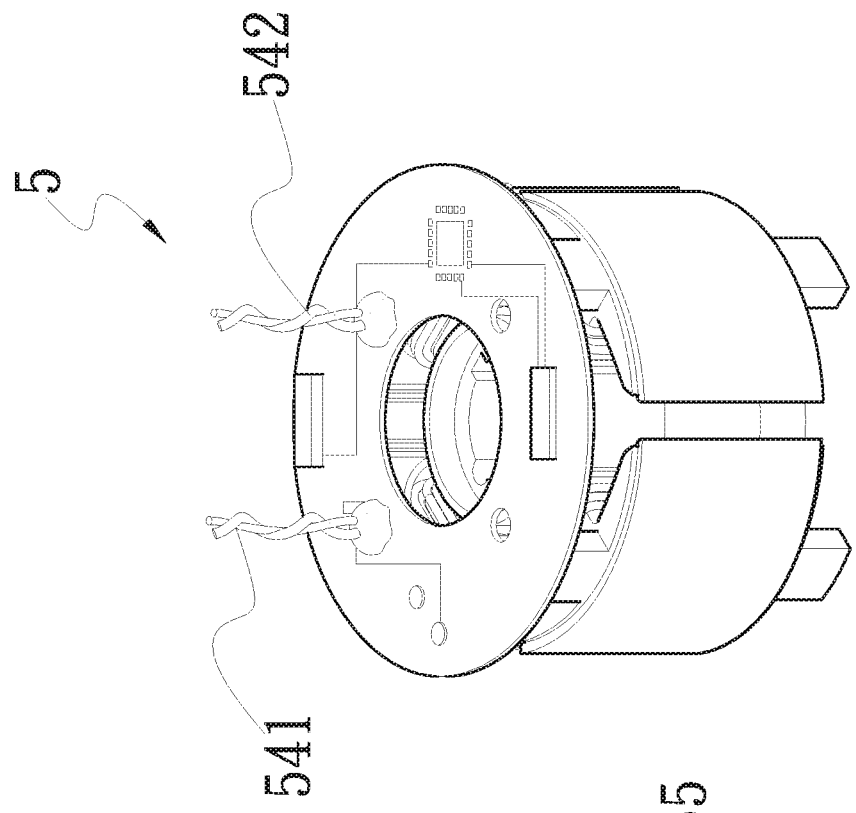
Figure 2A:
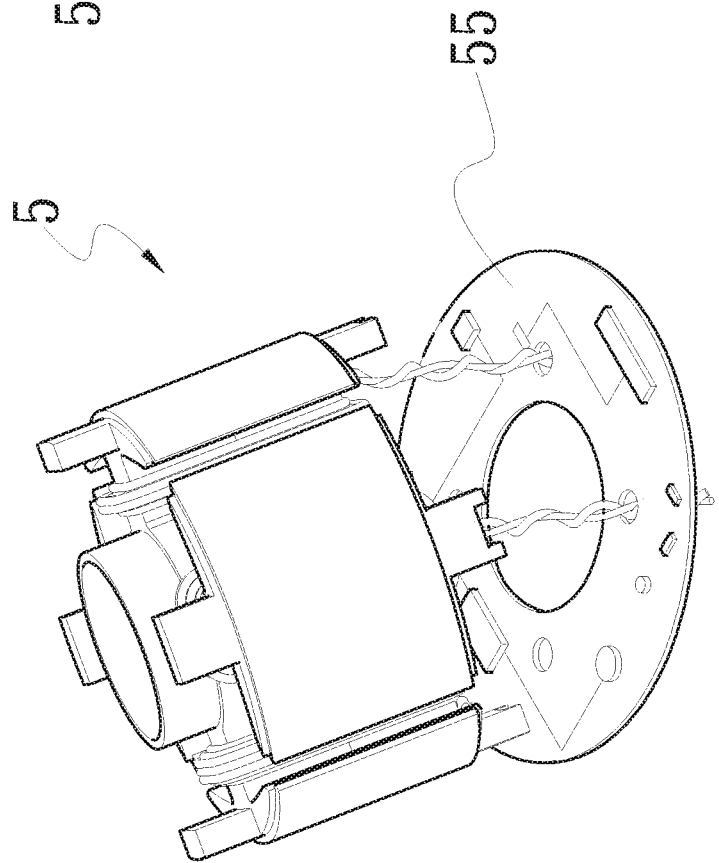
Figure 2C:
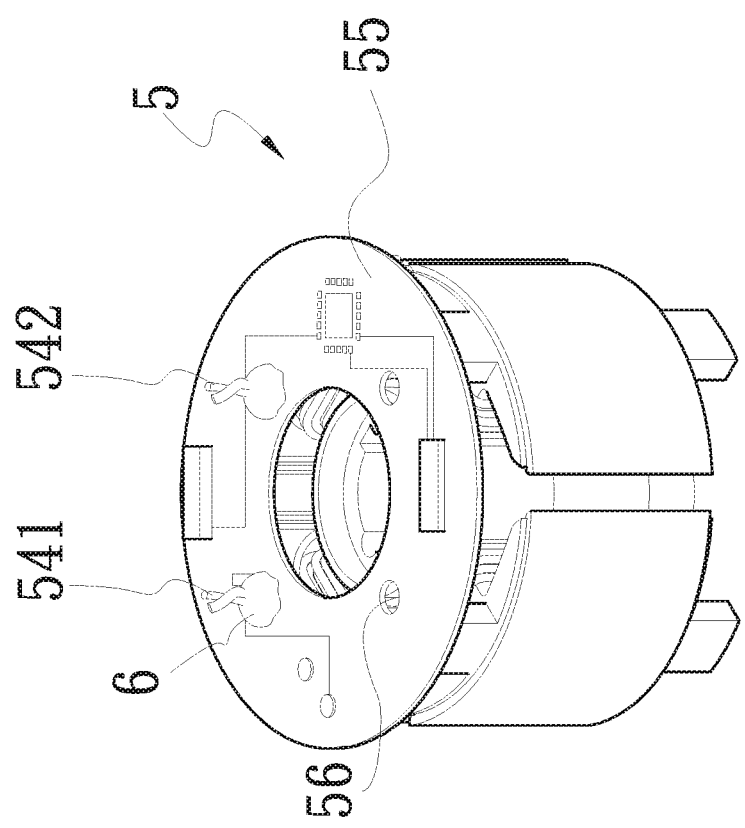

The present invention will now be described with some preferred embodiments thereof and by referring to the accompanying drawings. For the purpose of easy to understand, elements that are the same in the preferred embodiments are denoted by the same reference numerals.

Figure 3:
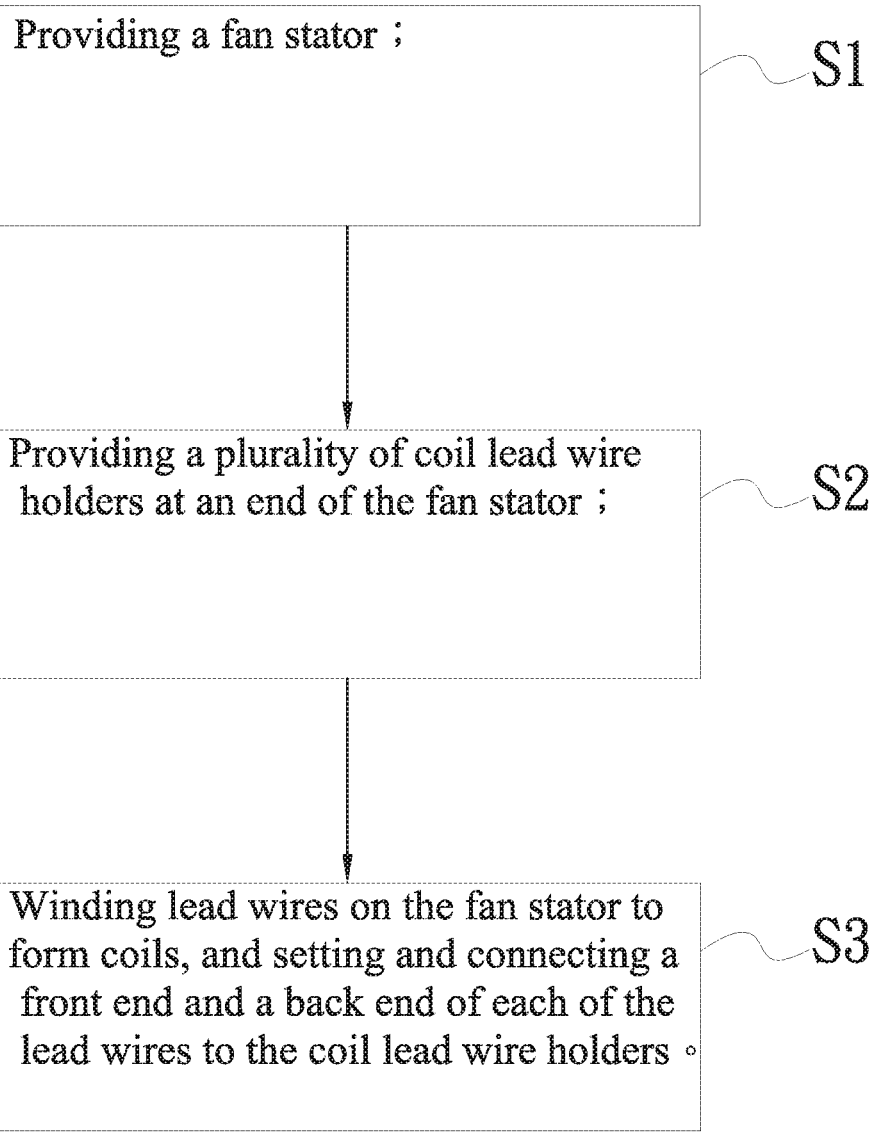
FIG. 3 is a flowchart showing steps included in a manufacturing method of fan stator structure according to a first embodiment of the present invention.
Figure 4A:
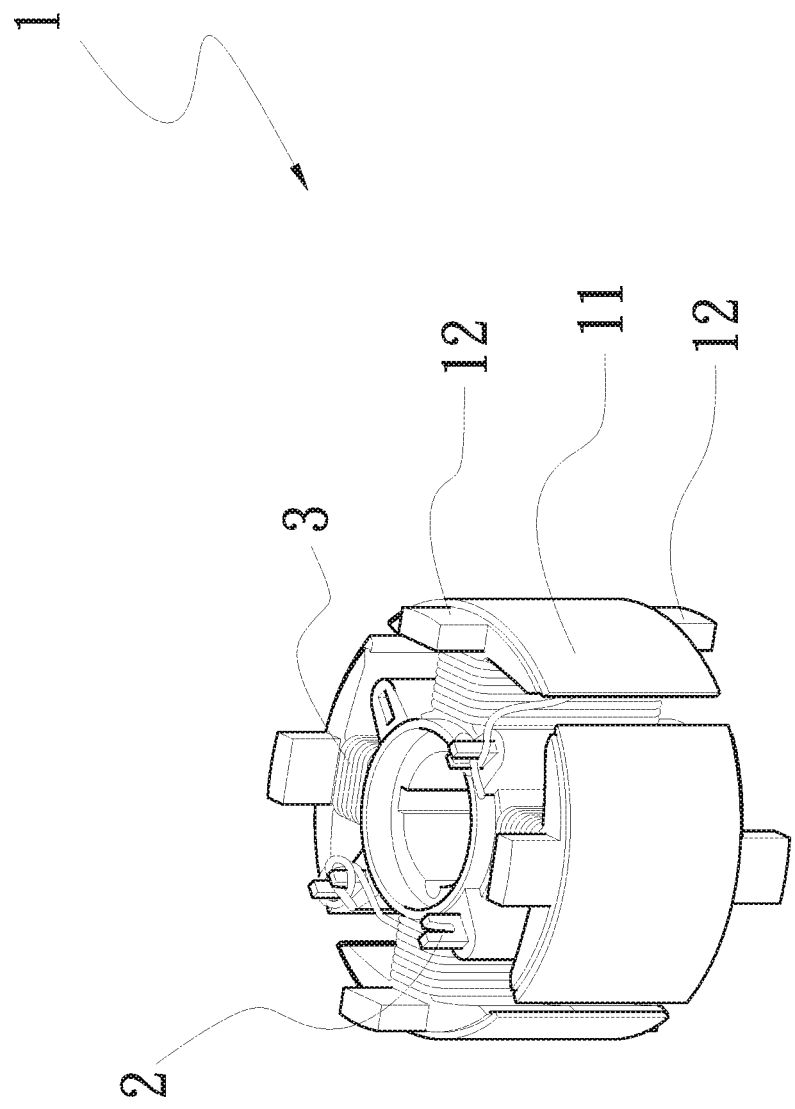
FIG. 4a is a perspective view of a fan stator structure manufactured using the method according to the first embodiment of the present invention.

Please refer to FIG. 3, which is a flowchart showing steps included in a manufacturing method of fan stator structure according to a first embodiment of the present invention; and to 4a, which is a perspective view of a fan stator structure manufactured using the method according to the first embodiment of the present invention; and to 4*b*, which shows a coil lead wire holder 2 used in the method of the present invention. As shown, the method according to the first embodiment of the present invention includes the following steps:

S1: Providing a fan stator;

S2: Providing a plurality of coil lead wire holders at an end of the fan stator; and S3: Winding lead wires on the fan stator to form coils, and setting and connecting a front end and a back end of each of the lead wires to the coil lead wire holders.

More specifically, in the step S1, a fan stator 1 is provided. The fan stator 1 includes a silicon steel lamination core 11 and a plurality of insulating supports 12. The silicon steel lamination core 11 is formed by laminating a plurality silicon steel sheets, and the insulating supports 12 are provided at an upper and a lower end of the silicon steel lamination core 11.

More specifically, in the step S2, a plurality of coil lead wire holders 2 is provided. Each of the coil lead wire holder 2 includes an inserting end 21, a receiving recess section 22 and a fixing end 23. The inserting end 21 and the fixing end 23 are located at two opposite ends of the coil lead wire holder 2. The receiving recess section 22 is provided near the inserting end 21 on at least one side thereof and located lower than the inserting end 21. Via the inserting ends 21, the coil lead wire holders 2 are located on the insulating supports 12 provided at a lower end of the fan stator 1. Alternatively, the coil lead wire holders 2 and the insulating supports 12 can be integrally formed through insert molding.

More specifically, in the step S3, the lead wire winding for forming coils 3 on the fan stator 1 can be done manually or using an automated winding machine. First, a front end of each of the lead wires for forming coils 3 on the fan stator 1 is set in and fixed to one coil lead wire holder 2 and then the lead wire winding is started to wind the lead wires around a plurality of poles of the silicon steel lamination core 11. When the lead wire winding has been completed for all the poles to form the coils 3, a back end of each of the coil lead wires is also set in or hooked to another coil lead wire holder 2. When the back ends of the lead wires of the coils 3 are connected to the coil lead wire holders 2, an insulating coating externally provided on the lead wires is rubbed off due to a frictional contact with the receiving recess section 22 of the coil lead wire holders 2. Thus, copper conductors of the lead wires are exposed to ensure an electrical connection of the coils 3 to the coil lead wire holders 2.

With the above fan stator structure manufacturing method, it is possible to eliminate the drawbacks of the conventional stator winding operation that the front and back ends of the lead wires require further twisting and trimming manually. In this way, the efficiency of winding coils can be largely upgraded to decrease the required time and labor costs and increase the good yield rate.

Figure 5:
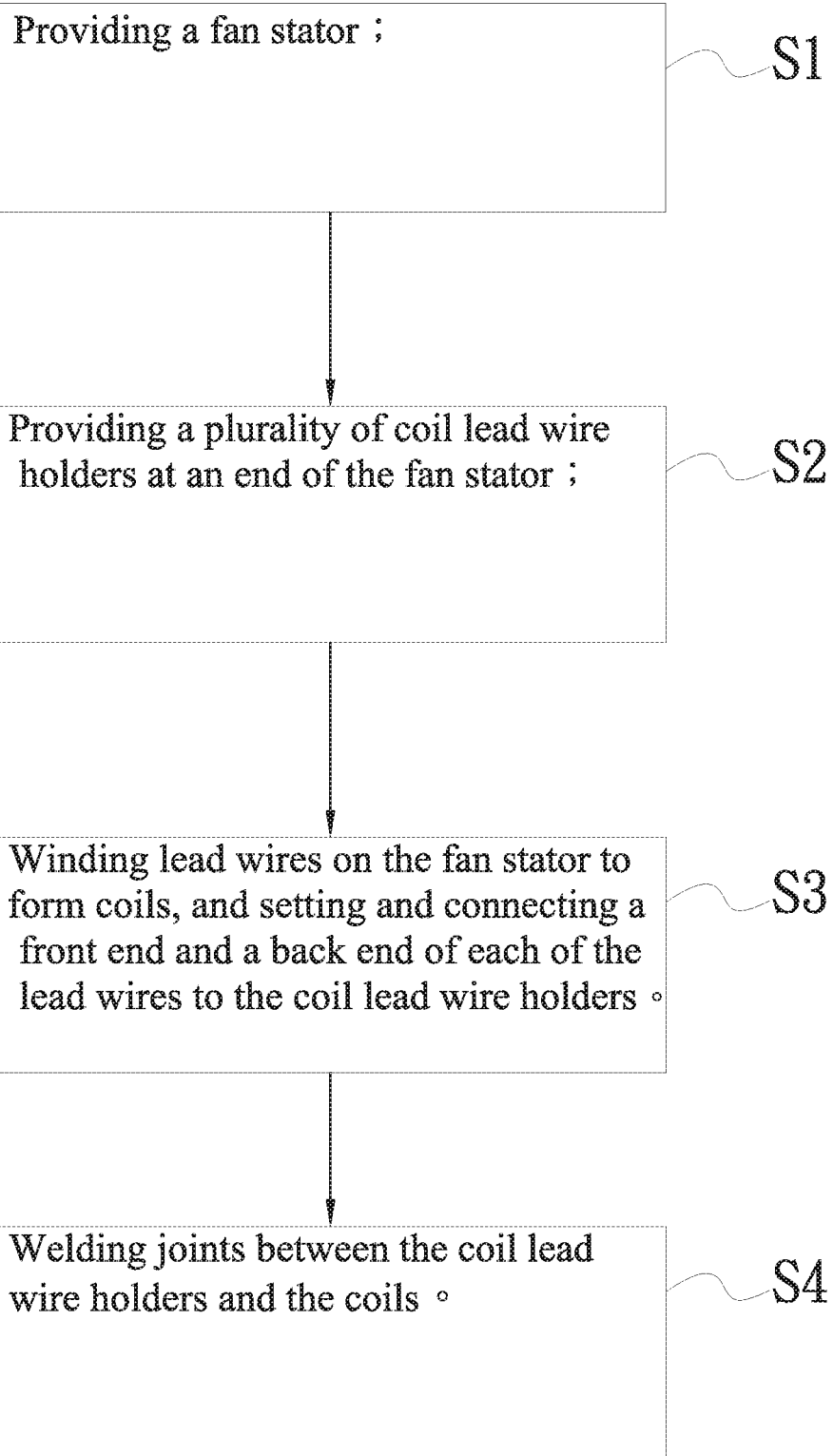
FIG. 5 is a flowchart showing steps included in a manufacturing method of fan stator structure according to a second embodiment of the present invention.
Figure 6:
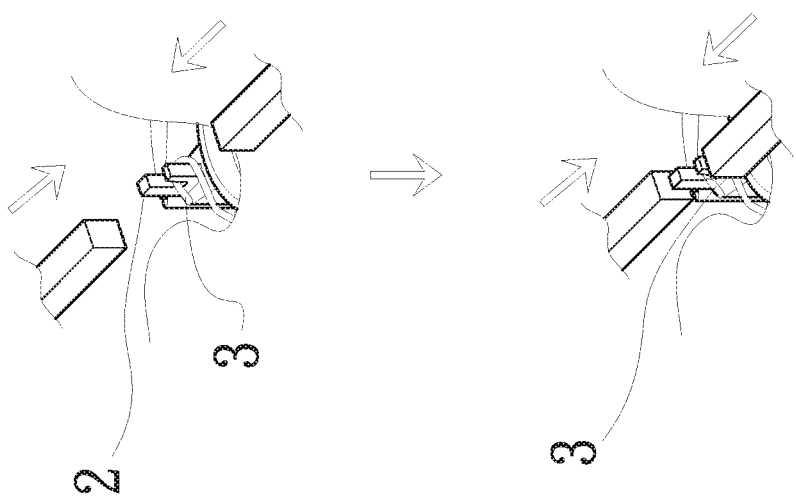
FIG. 6 is a fragmentary perspective view showing a welding step in the method according to the second embodiment of the present invention.

Please refer to FIG. 5 that is a flowchart showing steps included in a manufacturing method of fan stator structure according to a second embodiment of the present invention; and to FIG. 6 that is a fragmentary view illustrating a welding step in the method according to the second embodiment of the present invention. As shown, the method in the second embodiment includes the following steps:

S1: Providing a fan stator;

S2: Providing a plurality of coil lead wire holders at an end of the fan stator;

S3: Winding lead wires on the silicon steel lamination core of the fan stator to form coils, and setting and connecting a front end and a back end of each of the lead wires to the coil lead wire holders; and S4: Welding joints between the coil lead wire holders and the coils.

The above steps S1 to S3 are the same as those in the first embodiment, they are therefore, not repeatedly described herein. The second embodiment is different from the first one in that it further has a step S4 after the step S3.

More specifically, in the step S4, welding is performed at joints between the coils 3 and the coil lead wire holders 2, i.e. areas where the front and back ends of the lead wires of the coils are set in or hooked to the coil lead wire holders 2, so as to enable enhanced electric conduction and physical bonding strength between the coils 3 and the coil lead wire holders 2. The welding can be resistance welding or laser welding.

In the case of resistance welding, the joints between the coil lead wire holders 2 and the coils 3 are heated due to their resistance to a current passing therethrough, and the heated parts at the joints are melt to join to one another. The welding also destructs the insulating coating on the surface of lead wires at the front and back ends, which ensures an electrical connection of the coils 3 to the coil lead wire holders 2.

Figure 7:
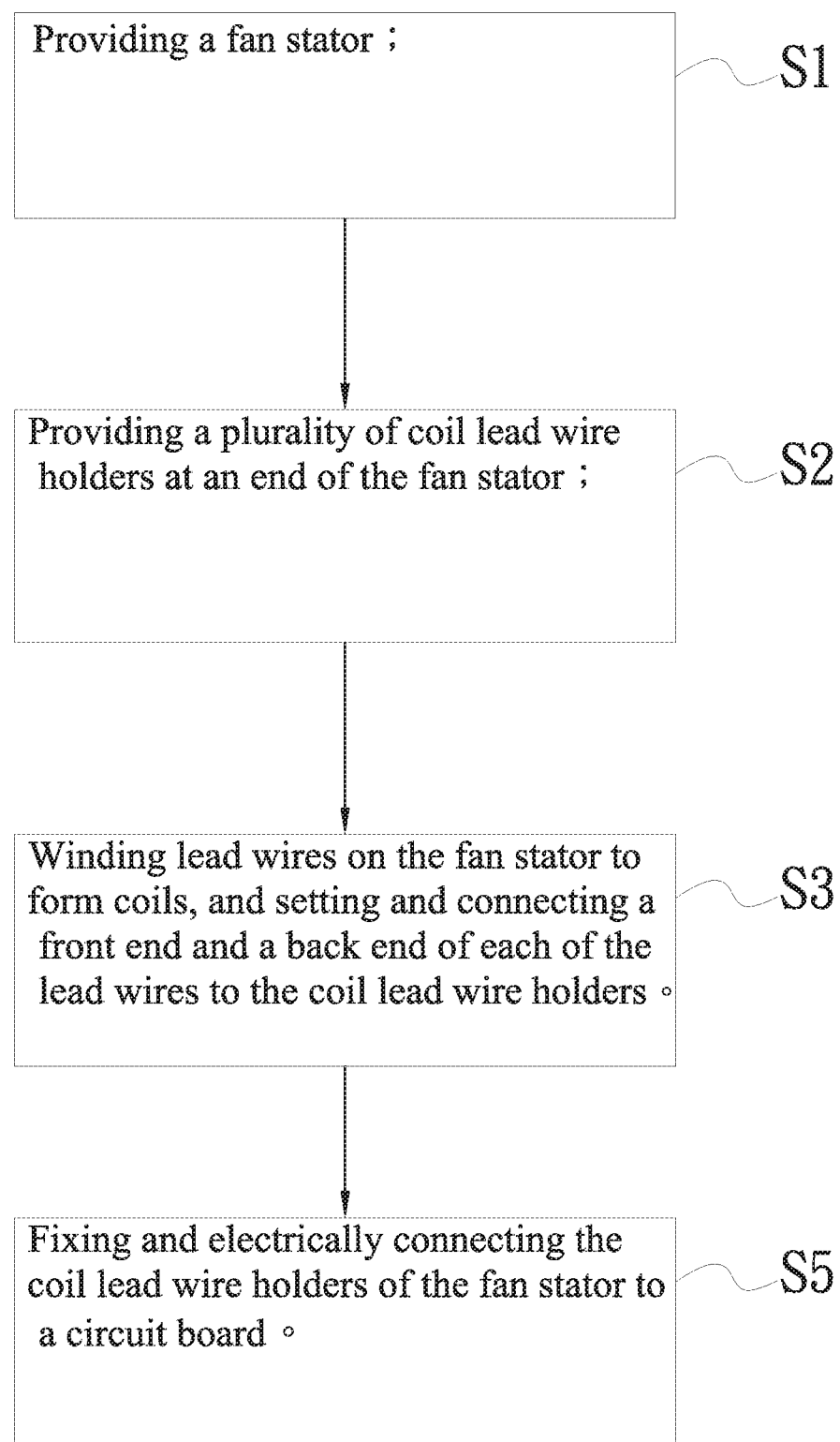
FIG. 7 is a flowchart showing steps included in a manufacturing method of fan stator structure according to a third embodiment of the present invention.
Figure 8:
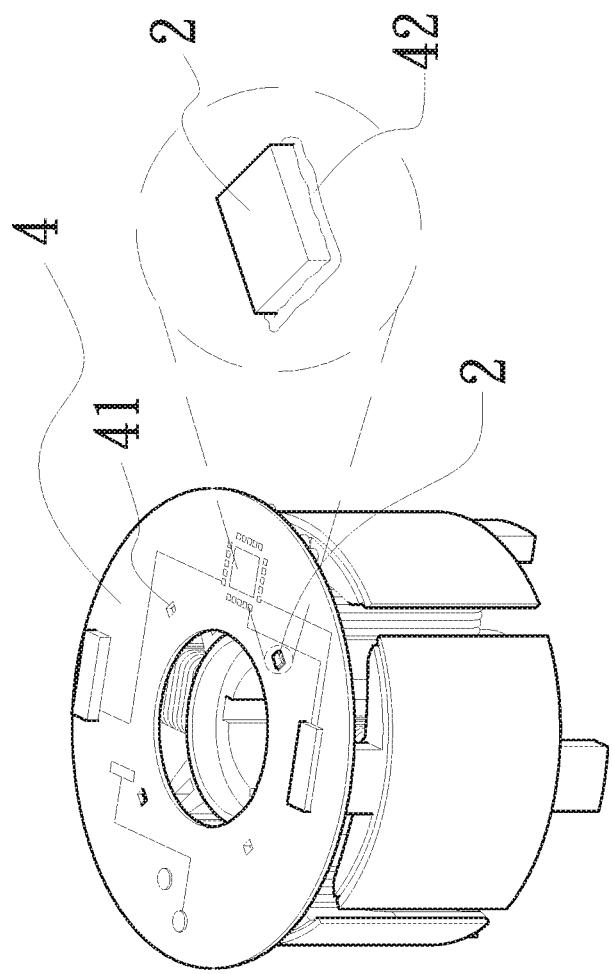
FIG. 8 is a perspective view of a stator structure manufactured using the method according to the third embodiment of the present invention.
Figure 8:
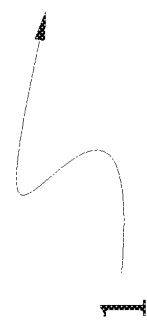

Please refer to FIG. 7 that is a flowchart showing steps included in a manufacturing method of fan stator structure according to a third embodiment of the present invention; and to FIG. 8 that is a perspective view of a stator structure manufactured using the method according to the third embodiment of the present invention. As shown, the method in the third embodiment includes the following steps:

S1: Providing a fan stator;

S2: Providing a plurality of coil lead wire holders at an end of the fan stator;

S3: Winding lead wires on the silicon steel lamination core of the fan stator to form coils, and setting and connecting a front end and a back end of each of the lead wires to the coil lead wire holders; and S5: Fixing and electrically connecting the coil lead wire holders of the fan stator to a circuit board.

The above steps S1 to S3 are the same as those in the first embodiment, they are therefore, not repeatedly described herein. The third embodiment is different from the first one in that it further has a step S5 after the step S3.

More specifically, in the step S5, the fan stator 1 is further fixed and electrically connected to a circuit board 4 after the front and back ends of the lead wires are connected to the coil lead wire holders 2 in the step S3, so as to complete the fan stator 1. The circuit board 4 is connected to the fan stator 1 via the coil lead wire holders 2, and the connection can be performed in two manners. In the first manner, the coil lead wire holders 2 are correspondingly welded to circuit contacts provided on a surface of the circuit board 4 to thereby electrically connect the fan stator 1 to the circuit board 4. In the first welding manner, the coil lead wire holders 2 have a solder layer applied to their surfaces or their one ends. When the solder layer is heated, it is melt to create a bond and electrical connection between the coil lead wire holders 2 and the circuit board 4.

In the second manner, locations on the circuit board 4 that are to be correspondingly connected to the coil lead wire holders 2 on the fan stator 1 are cut to form vias 41 thereat, and the coil lead wire holders 2 are in tight fit with the vias 41. The vias 41 have an electric conducting layer applied to wall surfaces thereof, so that the core lead wire holders 2 tightly fitted in the vias 41 are electrically connected to the circuit board 4 via the electric conducting layer. Alternatively, weld pads 42 can be distributed around the vias 41 on the circuit board 4. In this case, the coil lead wire holders 2 are correspondingly extended through the vias 41 on the circuit board 4 and then electrically connected to the circuit board 4 by spot welding them to the weld pats 42.

The main object of the present invention is to solve the drawbacks of the conventional fan stator coil winding operation, such as the manual twisting and trimming of the lead wire front ends and back ends, complicated and labor consuming procedures for welding to a circuit board, and poor good yield rate. Further, the method of the present invention can be implemented on automated apparatus to achieve automated production of fan stators at reduced labor cost while enables upgraded production efficiency and increased good yield rate.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A manufacturing method of a fan stator structure, the method comprising steps of:
   providing a fan stator;
   providing a plurality of coil lead wire holders at an end of the fan stator, each of the coil lead wire holders including an inserting end, a receiving recess section and a fixing end; the inserting end and the fixing end being located at two opposite ends of the coil lead wire holders; and the receiving recess section being provided near the inserting end on at least one side thereof and located lower than the inserting end;
   winding lead wires on the fan stator to form coils; and electrically connecting the front end and the back end of each of the lead wires to the coil lead wire holders at the end of the fan stator.

2. The method as claimed in claim 1, wherein the providing of the fan stator further comprises laminating a plurality of silicon steel sheets to form a laminated silicon steel core, forming insulation supports at an upper and lower end of the laminated silicon steel core, and locating the coil lead holders on the insulating supports.

3. The method as claimed in claim 1, further comprising welding joints between the coil lead wire holders and the coils following the winding lead wires on the fan stator.

4. The method as claimed in claim 3, wherein, in the welding step, the welding is selected from the group consisting of a resistance welding and a laser welding.

5. The method as claimed in claim 1, further comprising fixing and electrically connecting the coil lead wire holders of the fan stator to a circuit board following the winding lead wires on the fan stator.

6. The method as claimed in claim 5, wherein the fixing and electrically connecting includes fixing by electrically connecting the coil lead wire holders to the circuit board in a manner selected from the group consisting of a welding manner and a tight fit manner.

7. The method as claimed in claim 1, wherein the coil lead wire holders have a solder layer applied to surfaces of the coil lead wire holders.

\* \* \* \* \*